United States Patent
Dietrich et al.

(10) Patent No.: US 8,726,360 B2
(45) Date of Patent: *May 13, 2014

(54) TELECOMMUNICATION METHOD, COMPUTER PROGRAM PRODUCT AND COMPUTER SYSTEM

(75) Inventors: Frank Dietrich, Berlin (DE); Manfred Paeschke, Wandlitz (DE); Robert Fiedler, Hoppegarten (DE)

(73) Assignee: Bundesdruckerei GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/120,983

(22) PCT Filed: Sep. 4, 2009

(86) PCT No.: PCT/EP2009/061476
§ 371 (c)(1),
(2), (4) Date: Oct. 7, 2011

(87) PCT Pub. No.: WO2010/031700
PCT Pub. Date: Mar. 25, 2010

(65) Prior Publication Data
US 2012/0023559 A1 Jan. 26, 2012

(30) Foreign Application Priority Data

Sep. 22, 2008 (DE) .......................... 10 2008 042 262
Oct. 2, 2008 (DE) .......................... 10 2008 042 582

(51) Int. Cl.
*H04L 9/00* (2006.01)
*H04L 9/32* (2006.01)

(52) U.S. Cl.
USPC .............. 726/9; 713/168; 713/182; 713/185; 705/67; 455/410; 380/247; 380/255; 709/219; 709/225; 709/228; 726/6

(58) Field of Classification Search
USPC ............................................................ 726/6
See application file for complete search history.

(56) References Cited

U.S. PATENT DOCUMENTS 5,825,875 A * 10/1998 Ugon ............................... 705/65
5,918,228 A * 6/1999 Rich et al. .......................... 1/1

(Continued)

FOREIGN PATENT DOCUMENTS

| DE | 10306338 A1 | 8/2004 | |
| EP | 1802155 A1 | 6/2007 | |
| WO | WO 97/22092 | * 6/1997 | ................ G07F 7/10 |

OTHER PUBLICATIONS

Ty Mey Eap et al., Enabling User Control with Personal Identity Management, International Conference on Services Computing 60-67 (Jul. 2007).*

(Continued)

*Primary Examiner* — Morshed Mehedi
*Assistant Examiner* — Sharon Lynch

(57) ABSTRACT

The invention relates to a telecommunication method having the following steps:
establishing a first connection (101) between a first ID token (106) and a first computer system (136) via a second computer system (100) for reading at least one first attribute from the first ID token,
generating a first soft token, wherein the first soft token comprises the at least one first attribute and a time specification, and wherein the first soft token is signed by the first computer system,
sending the first soft token from the first computer system to a third computer system (150),
wherein the first connection is a connection with end-to-end encryption.

22 Claims, 9 Drawing Sheets

(56) References Cited

U.S. PATENT DOCUMENTS

Figure 2:
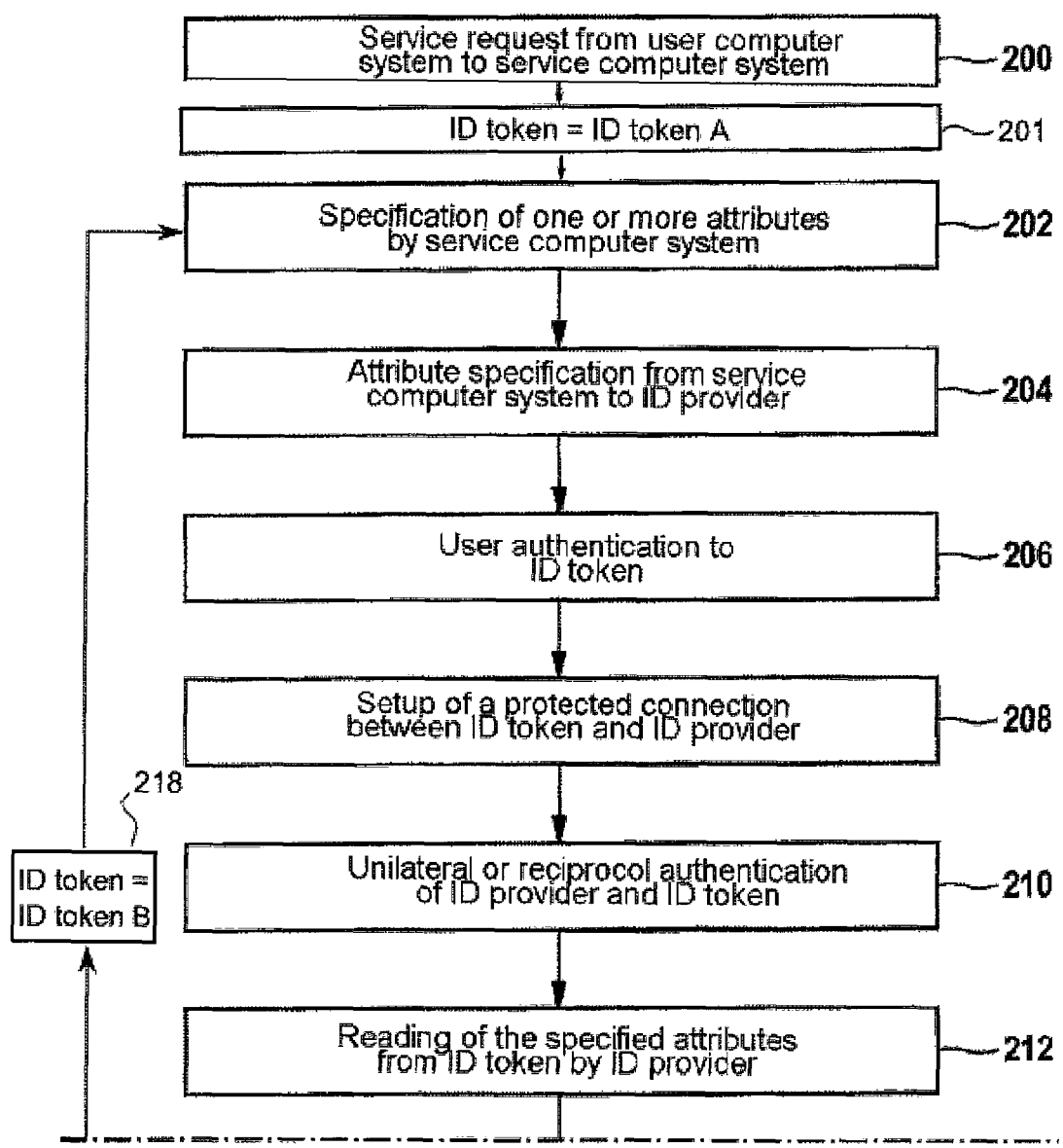

| | | | |
|---|---|---|---|
| 6,173,400 B1* | 1/2001 | Perlman et al. | 713/172 |
| 6,442,532 B1* | 8/2002 | Kawan | 705/36 R |
| 7,178,025 B2* | 2/2007 | Scheidt et al. | 713/168 |
| 7,290,288 B2* | 10/2007 | Gregg et al. | 726/28 |
| 8,387,108 B1* | 2/2013 | Satish et al. | 726/1 |
| 2001/0027527 A1* | 10/2001 | Khidekel et al. | 713/201 |
| 2001/0045451 A1* | 11/2001 | Tan et al. | 235/375 |
| 2002/0097159 A1* | 7/2002 | Hooglander | 340/573.1 |
| 2004/0034774 A1* | 2/2004 | Le Saint | 713/169 |
| 2004/0128383 A1* | 7/2004 | Hinton | 709/225 |
| 2004/0128390 A1* | 7/2004 | Blakley et al. | 709/228 |
| 2004/0139028 A1* | 7/2004 | Fishman et al. | 705/67 |
| 2004/0210757 A1* | 10/2004 | Kogan et al. | 713/182 |
| 2005/0105731 A1* | 5/2005 | Basquin | 380/247 |
| 2005/0138421 A1* | 6/2005 | Fedronic et al. | 713/201 |
| 2005/0235148 A1* | 10/2005 | Scheidt et al. | 713/168 |
| 2006/0005263 A1* | 1/2006 | Hardt | 726/28 |
| 2006/0294583 A1* | 12/2006 | Cowburn et al. | 726/10 |
| 2007/0132548 A1* | 6/2007 | Baraz et al. | 340/5.6 |
| 2007/0208940 A1* | 9/2007 | Adelman et al. | 713/168 |
| 2007/0282881 A1* | 12/2007 | Relyea | 707/101 |
| 2007/0283424 A1* | 12/2007 | Kinser et al. | 726/5 |
| 2008/0005566 A1* | 1/2008 | Morita | 713/171 |
| 2008/0120511 A1* | 5/2008 | Naguib | 713/194 |
| 2008/0184339 A1* | 7/2008 | Shewchuk et al. | 726/3 |
| 2008/0229402 A1* | 9/2008 | Smetters et al. | 726/9 |
| 2008/0229411 A1* | 9/2008 | Norman et al. | 726/20 |
| 2009/0198618 A1* | 8/2009 | Chan et al. | 705/66 |
| 2009/0292927 A1* | 11/2009 | Wenzel et al. | 713/185 |
| 2011/0023103 A1* | 1/2011 | Dietrich et al. | 726/9 |
| 2011/0264916 A1* | 10/2011 | Fischer et al. | 713/175 |
| 2011/0296512 A1* | 12/2011 | Dietrich et al. | 726/9 |
| 2012/0023559 A1* | 1/2012 | Dietrich et al. | 726/6 |
| 2012/0167186 A1* | 6/2012 | Dietrich | 726/6 |
| 2012/0174193 A1* | 7/2012 | Dietrich | 726/4 |

OTHER PUBLICATIONS

Zhikui Chen, A privacy Enabled Service Authorization Based on a User-centric Virtual Identity Management System, Second International Conference on Communications and Networking in China 423-427 (Aug. 2007).*

Md. Faruk Hossain Mazumder et al., Windows Cardspace, Information Security Course Project, Dept of Computer and Information Science, Linkoping Univ., Linkoping, Sweden, (2007), available athttp://www.ida.liu.se/~TDDC03/oldprojects/2007/projects/14.pdf.*

C. C Kolias et al., Enhancing User Privacy in Adaptive Web Sites with Client-Side User Profiles, Third International Workshop on Semantic Media Adaptation and Personalization 170-176 (2008).*

Gerrit Hornung, 10 The Digital Identity 1-8, 220-224, 318-328, 339, 368-373, 440 (Prof. Dr. Alexander Rossnagel ed., 2005).*

* cited by examiner

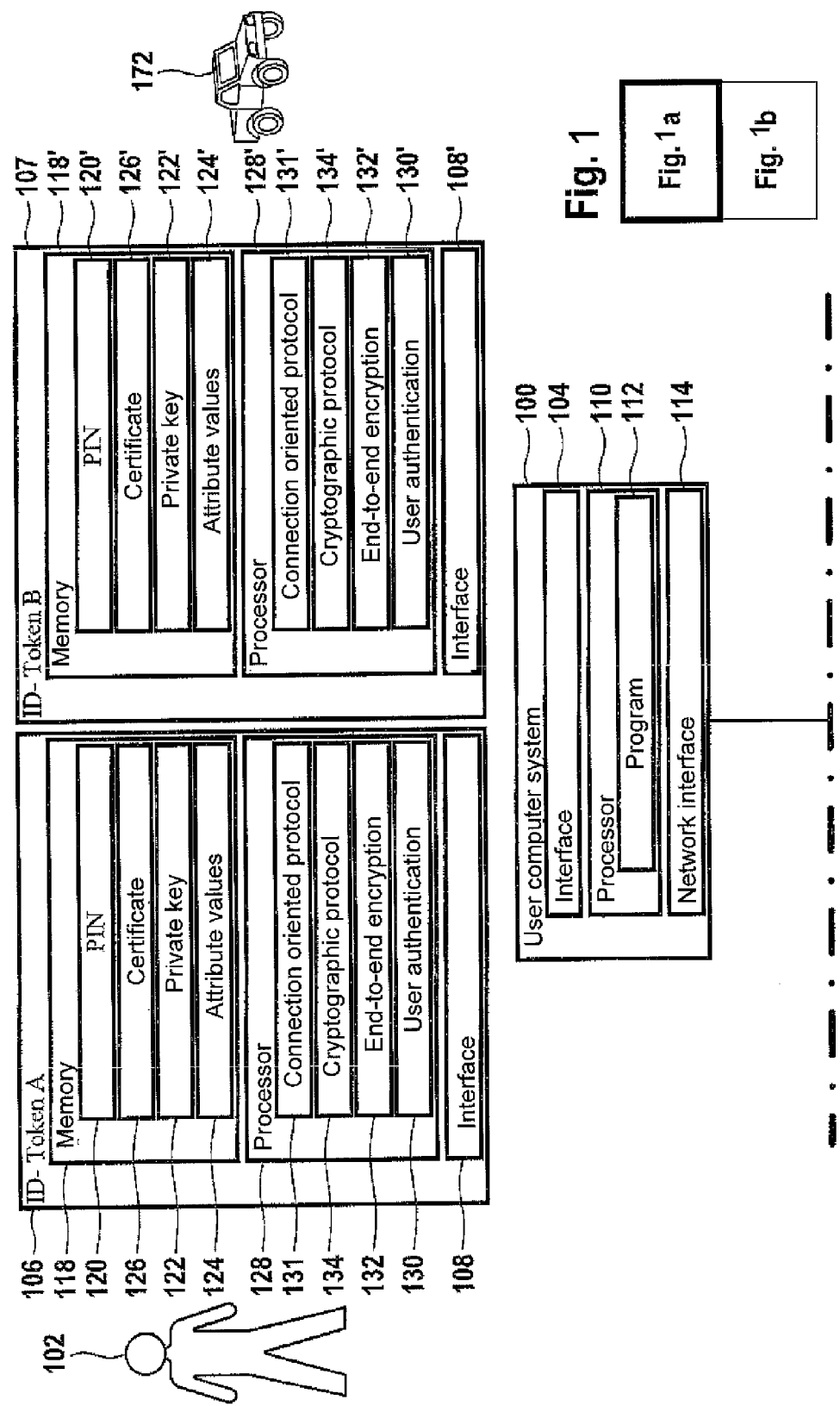

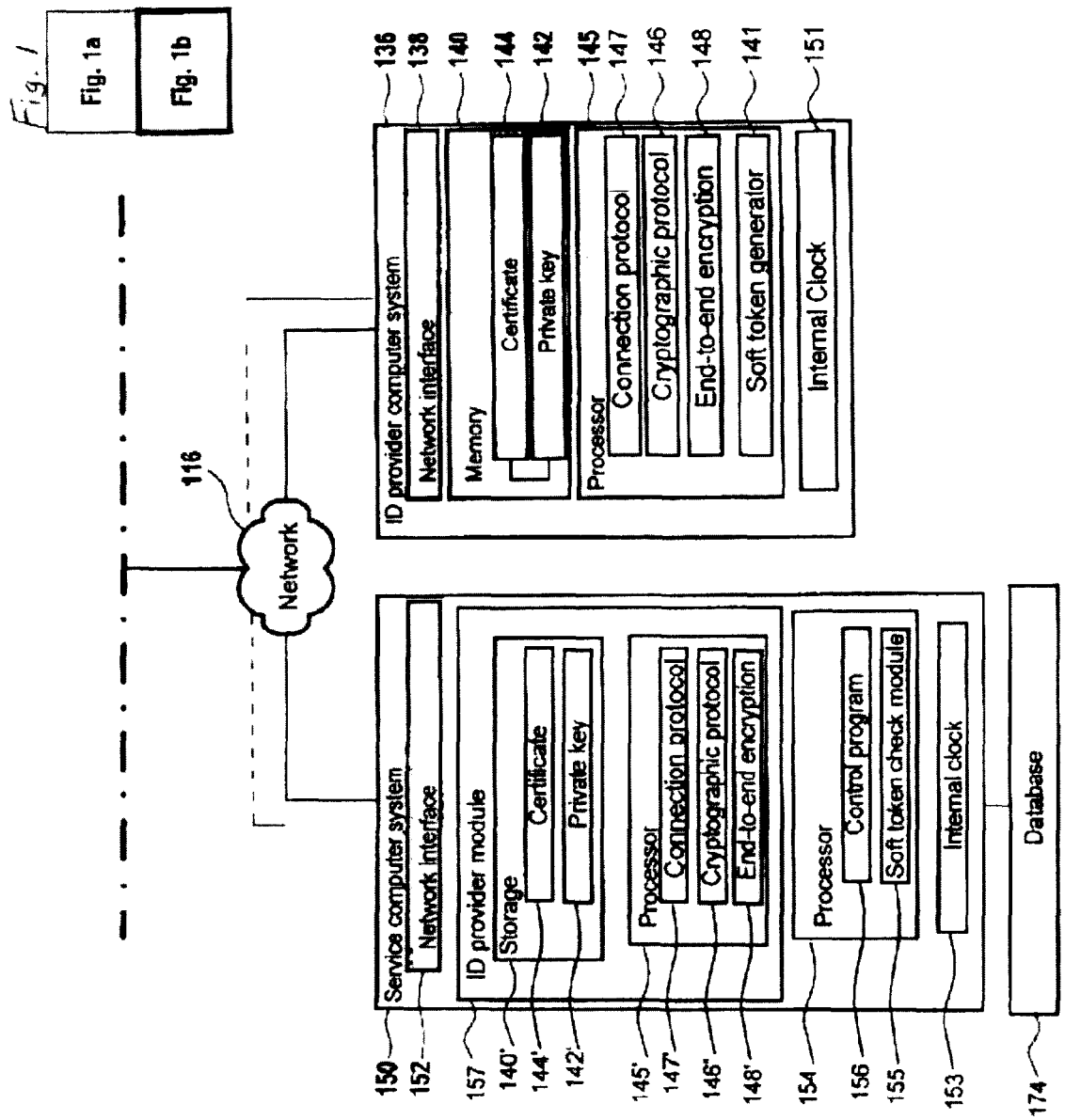

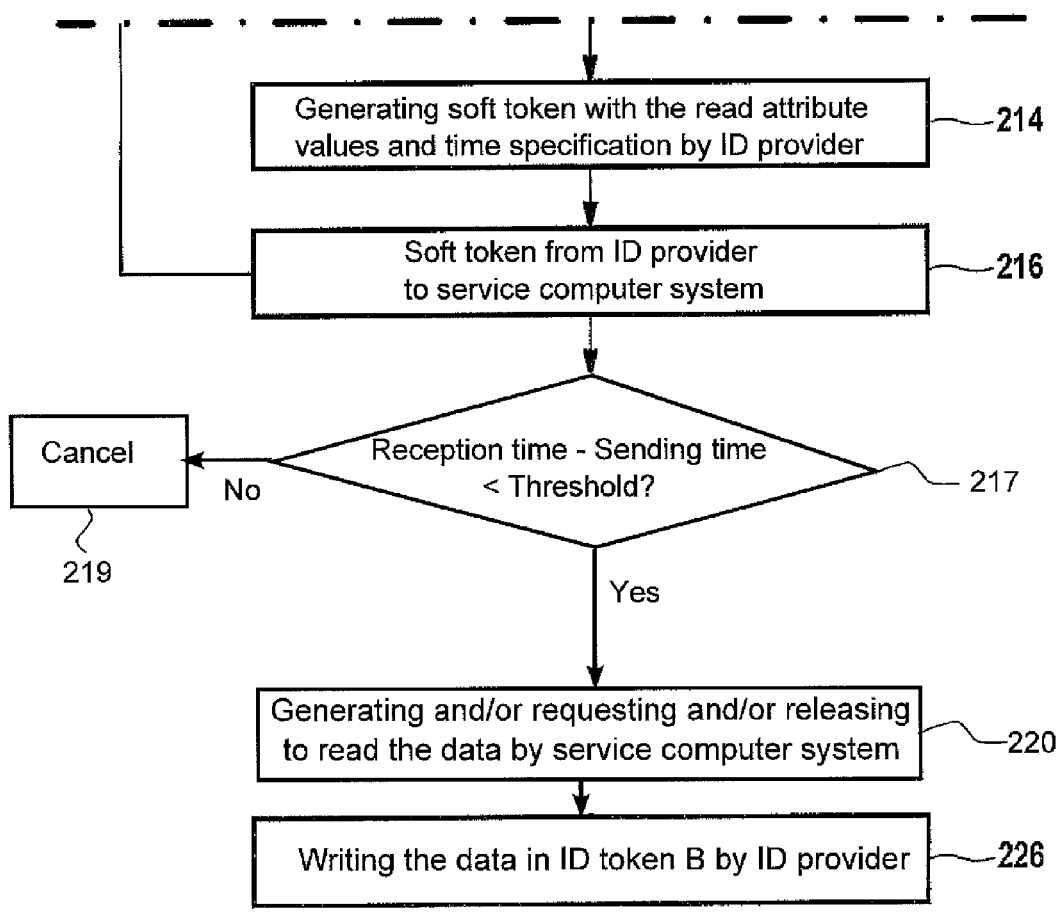

Fig. 3a | Fig. 3b

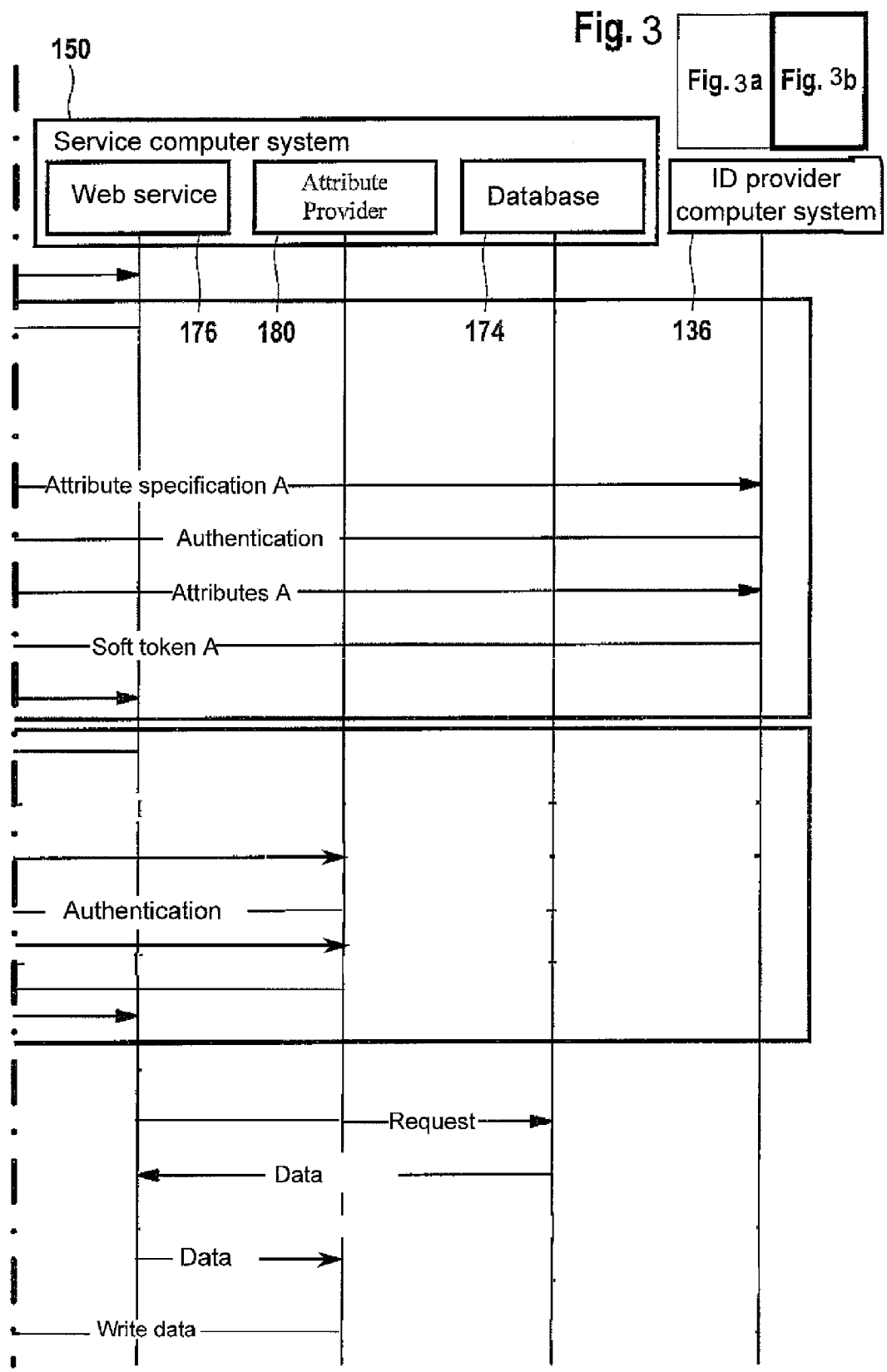

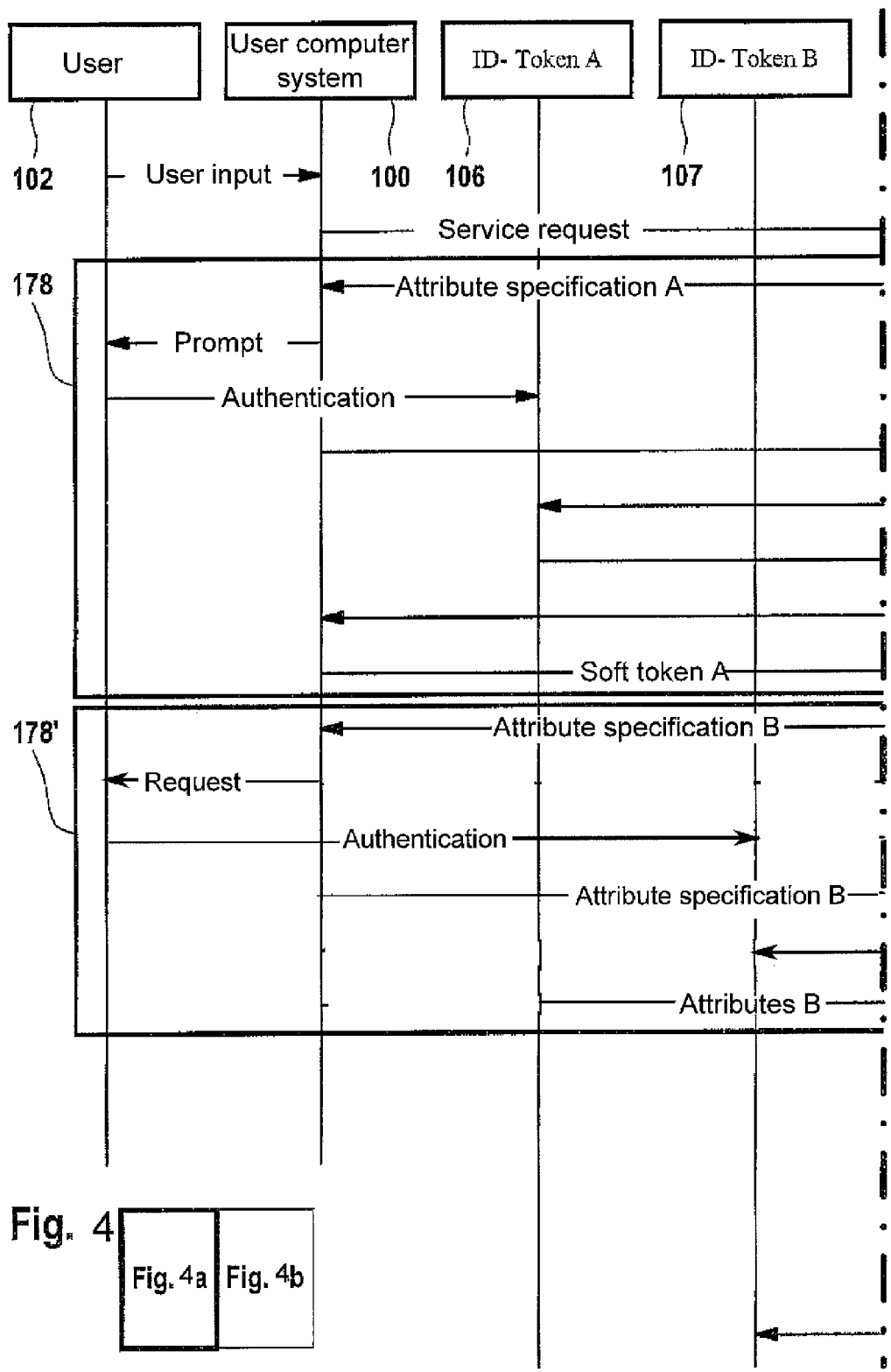

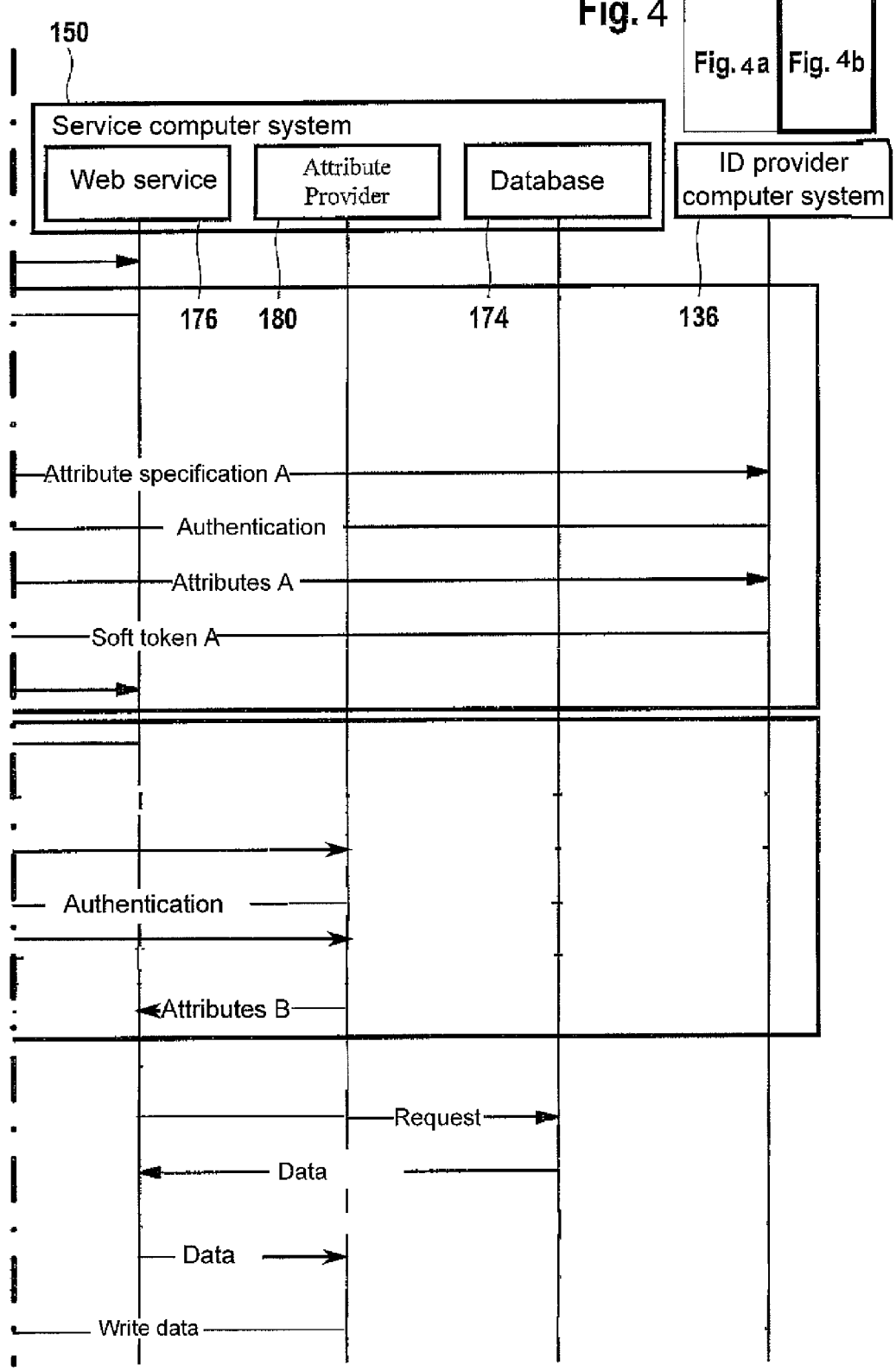

TELECOMMUNICATION METHOD, COMPUTER PROGRAM PRODUCT AND COMPUTER SYSTEM

The invention relates to a telecommunication method, computer program product and computer system.

The prior art discloses various methods for managing what is known as the digital identity of a user:

Microsoft Windows CardSpace is a client-based digital identity system which is intended to allow Internet users to communicate their digital identity to online services. One drawback in this context, inter alia, is that the user can manipulate his digital identity.

By contrast, OPENID is a server-based system. What is known as an identity server stores a database with the digital identities of the registered users. One drawback of this, inter alia, is inadequate data protection, since the digital identities of the users are stored centrally and the user behavior can be recorded.

U.S. 2007/0294431 A1 discloses a further method for managing the digital identities which likewise requires user registration.

From the patent application DE 2008000067.1-31 of the same applicant a method for reading of at least one attribute stored in an ID token is known, wherein an authentication of the user as well as of a computer system to the ID token is required for allowing reading access to an attribute stored in ID token, such that this can be forwarded to a computer system for providing a service.

From the patent application DE 2008042262.2 of the same applicant a method for storing data in an ID token is known, wherein a condition for writing the data into the ID via a connection is that a further connection to a further ID token exists, wherein both connection have an end-to-end encryption and operate according to a connection oriented protocol.

From U.S. 2003/0023858 A1 a method for generating a data set is known, which shall serve as an electronic passport. The data set is downloaded by a user and stored on a mobile phone for example.

By contrast, the invention is based on the object of providing an improved telecommunication method, and also an appropriate computer program product, and a computer system.

The objects on which the invention is based are respectively achieved by means of the features of the independent patent claims. Embodiments of the invention are specified in the dependent claims.

According to embodiments of the invention a telecommunication method is provided which comprises the following steps: A first connection is established between a first ID token and a first computer system via a second computer system The first ID token can for example be a document, in particular a value or a safety document, in particular an identification document, e.g. an electronic identity card.

The first ID token has an electronic storage, in which at least a first attribute is stored. The first ID token can be allocated unambiguously to a person. Depending on the embodiment several of such first attributes can be required for an unambiguous allocation.

For example the first computer system can be a server computer system of an ID provider, wherein herein an ID provider is understood as a trustworthy instance.

The second computer system can be a personal computer of a user, which is connected to the first computer system via a network such as the internet. The second computer system can comprise an integrated or external reading device for the first ID token, wherein the interface between the reading device and the first ID token can be designed as a contact or contactless interface, in particular as a radio interface which operates for example according to an RFID method.

The first computer system reads the first attribute from the first ID token via the first connection. The first computer system then generates a first soft token, which comprises the first attribute and a time specification. Herein a soft token is understood as a data set with a digital signature. The first soft token is signed by the first computer system.

The time specification can be a scheduled sending instant of time for sending the first soft token from the first computer system to a third computer system or a lifetime. Sending the first soft token from the first computer system to the third computer system can be performed directly to the third computer system or via the second computer system, from where the first soft token is then forwarded to the third computer system.

In the latter case the second computer system can be designed in such a way that the user the user can take note of the first attribute being comprised by the first soft token without changing the first attribute, wherein forwarding the first soft token from the second computer system to the third computer system is performed only after authorization of the user. This leads to the advantage that the user can gain certainty about the correct content of the first soft token, and that it is communicated to the user which of his attributes shall be sent to the third computer system.

The first connection, via which the first attribute is read by the first computer system from the first ID token, is a connection with end-to-end encryption, such that the user of the second computer system, via which the connection is established, cannot carry out manipulations such as changing the first attribute.

Embodiments of the invention are especially advantageous because sending the first attribute in form of the first soft token from the first computer system is a flexible, comfortable, with relatively low complexity implementable and at the same time very safe kind of providing trustworthily the first attribute, which is stored in the first ID token, in a network is provided.

By the use of the time specification being located in the first soft token the time period for the usability of the first soft token by the receiving system such as the third computer system can be limited. In particular the time specification can be the specification of a future time, until which the first soft token can be considered as trustworthy. The time specification can also be the instant of time of generation of the first soft token or the instant of time of sending the first soft token from the first computer system.

In particular so called replay attacks are prevented by using this time specification. Namely if the first soft token is intercepted during the transmission from the first computer system to the third computer system for obtaining a copy thereof, a replay attack is practically not possible because this would require a certain time period but after expiration of the time being required for a replay attack the first soft token has already exceeded its lifetime, which is specified by the time specification being comprised by the first soft token.

According to an embodiment of the invention the time specification is an absolute time such as a specification of the time as coordinated world time (UTC).

According to an embodiment of the invention the first computer system and the third computer system each comprise internal clocks, which are synchronized with each other. The time specification can then be a system time of the computer systems.

The third computer system can be a server computer system, which is connected to the first and/or to the second computer system via the network. The third computer system can be a server computer system of a service provider, which is denoted below also as service computer system.

Preferably the first attributes are forwarded as first soft token from the first computer system to the third computer system directly after reading them from the first ID token, such that the first attribute does not need to be stored permanently by the first computer system. In contrast it suffices to store the first attribute in the first computer system only as long as it is required for forwarding the first attribute to the third computer system after it has been read from the first ID token. An eventually required temporary copy for the purpose of forwarding of the first attribute is deleted by the first computer system directly after sending. This is advantageous because the first computer system can be designed stateless and data in need for protection, which can comprise the first attribute, is not gathered by the first computer system.

According to an embodiment of the invention the third computer system establishes a second connection to a second ID token via the second computers system in order to read at least one second attribute from the second ID token. This second connection is again a connection with an end-to-end encryption.

The third computer system uses the first and the second attributes for determination of data. This can be performed by calculating the data from the first and the second attributes by the third computer system or by an access to a database with the aid of the first and the second attributes and querying the data from the database by the third computer system.

The third computer system then writes data into the second ID token via the second connection in order to store the data in the second ID token.

It is a condition for writing the data into the second ID token by the third computer system that the first soft token has been received by the third computer system at a reception time, at which the first soft token was still valid. Depending on the embodiment the validity is checked by the third computer system for example by comparing the maximum validity denoted in the first soft token with the time basis of the third computer system or by calculating a difference between the sending time denoted in the first soft token and the reception time and comparing the difference to a control value. Particularly so-called replay attacks can be repelled.

Embodiments of the invention are especially advantageous, because the invention makes it possible to write the second ID token with document individual data securely, wherein the first ID token serves as a an "anchor of trust". The owner of the first ID token is enabled to have his second ID token written with document individual data for the first time or to update such document individual data, in particular online without having to appear personally for example at a government agency.

For example, the first ID token is assigned to the authorized user, i.e. the owner of the ID token. For example the first ID token is an electronic passport. In contrast the second ID token can be assigned to a thing, e.g. a motor vehicle. For instance the second ID token is an electronic motor vehicle certificate of title or an electronic motor vehicle registration certificate. The invention allows updating the electronic motor vehicle certificate of title or the electronic motor vehicle registration certificate online, for example when the owner of the motor vehicle and/or the license number is changed.

In line with the invention, a "document" is understood to mean paper-based and/or plastic-based documents, such as identification documents, particularly passports, identification cards, visas and driver's licenses, vehicle registration certificates, vehicle registration documents, corporate identification cards, health cards or other ID documents and also chip cards, payment means, particularly bankers' cards and credit cards, waybills or other credentials, which incorporate a data memory for storing the at least one attribute.

Embodiments of the invention are especially advantageous, because the first connection can be canceled after the at least one first attribute has been read from the first ID token. Establishing the second connection can be performed after cancellation of the first connection. This has the advantage that the first and the second connection do not need to be kept up parallely, which would require either two reading devices or a reading device, which is able to establish two connection to the first and respectively to the second ID token at the same time. On the contrary, embodiments of the invention allow that the second computer system comprises only one simple reading device, which is only able to establish a connection to one of the ID tokens, i.e. it does not allow to establish two connections at the same time.

Embodiments of the invention are thus particularly advantageous, since the at least one attribute is read from a particularly trustworthy document, for example an official document. It is also of particular advantage that central storage of the attributes is not necessary. The invention thus allows a particularly high level of trustworthiness for the communication of the attributes associated with a digital identity, accompanied by optimum data protection with extremely convenient handling.

According to one embodiment of the invention, the first computer system has at least one certificate which is used for authenticating the first computer system to the first and/or the second ID token. The certificate contains an indication of those attributes for which the first computer system has read authorization. The first ID token uses said certificate to check whether the first computer system has the necessary read authorization for read access to the first attribute before such read access can be performed by the first computer system.

According to one embodiment of the invention, the first computer system sends the first soft token directly to the third computer system. By way of example, the third computer system may be a server of a government agency, e.g. a registration agency for motor vehicles.

According to one embodiment of the invention, the first soft token is transmitted from the first computer system to the second computer system of the user first of all. By way of example, the second computer system has an ordinary Internet browser which the user can use to open a web page on the third computer system. The user can input into the web page a request for a service like for example updating his electronic motor vehicle registration certificate.

The third computer system then specifies those attributes, for example of the user and/or of his first ID token, which it requires in order to provide the service. The corresponding attribute specification, which contains the specification of these attributes, is then sent from the third computer system to the first computer system. This can be done with or without interposition of the second computer system. In the latter case, the user can specify the desired first computer system to the third computer system, for example by inputting the URL of the first computer system into a web page on the third computer system from the second computer system. But the first computer system can also be preset in a fixed way by the third computer system.

According to one embodiment of the invention, the service request from the user to the third computer system contains the indication of an identifier, wherein the identifier identifies the first computer system. By way of example, the identifier is a link, for example a URL on the first computer system.

According to one embodiment of the invention, the attribute specification is sent not directly from the third computer system to the first computer system but rather from the third computer system to the second computer system first of all.

According to one embodiment of the invention, the first computer system has a plurality of certificates with different read rights. On the basis of the receipt of the attribute specification, the first computer system selects one or more of these certificates in order to read the relevant attributes from the ID tokens.

According to one embodiment of the invention the first ID token is an electronic vehicle certificate of title, which is assigned in a fixed way to a motor vehicle but not to a user. An authentication of the user to the ID token may then be omitted.

Additionally to the authentication of the first computer system to the ID token, as for example known as a so-called Extended Access Control for machine-readable travel documents (MRTD) and specified by the international aeronautical authority ICAO, it may be required depending on the embodiment that the user authenticates himself also to the ID token. By was of example the user is unlocked by a successful authentication of the user to the ID token, such that the further steps, namely the authentication of the first computer system to the ID token and/or establishing of a protected connection for reading the attributes, can be performed.

According to one embodiment the ID token has means for an end-to-end encryption. This allows to establish the connection between the ID and the first computer system via a third computer system of the user, because the user can not carry out changes to the data transmitted via the connection because of the end-to-end encryption.

In a further aspect, the invention relates to a computer program product, particularly a digital storage medium, with executable program instructions for performing a method according to the invention.

In a further aspect, the invention relates to a computer system for performing a method according to the invention.

Figure 3:
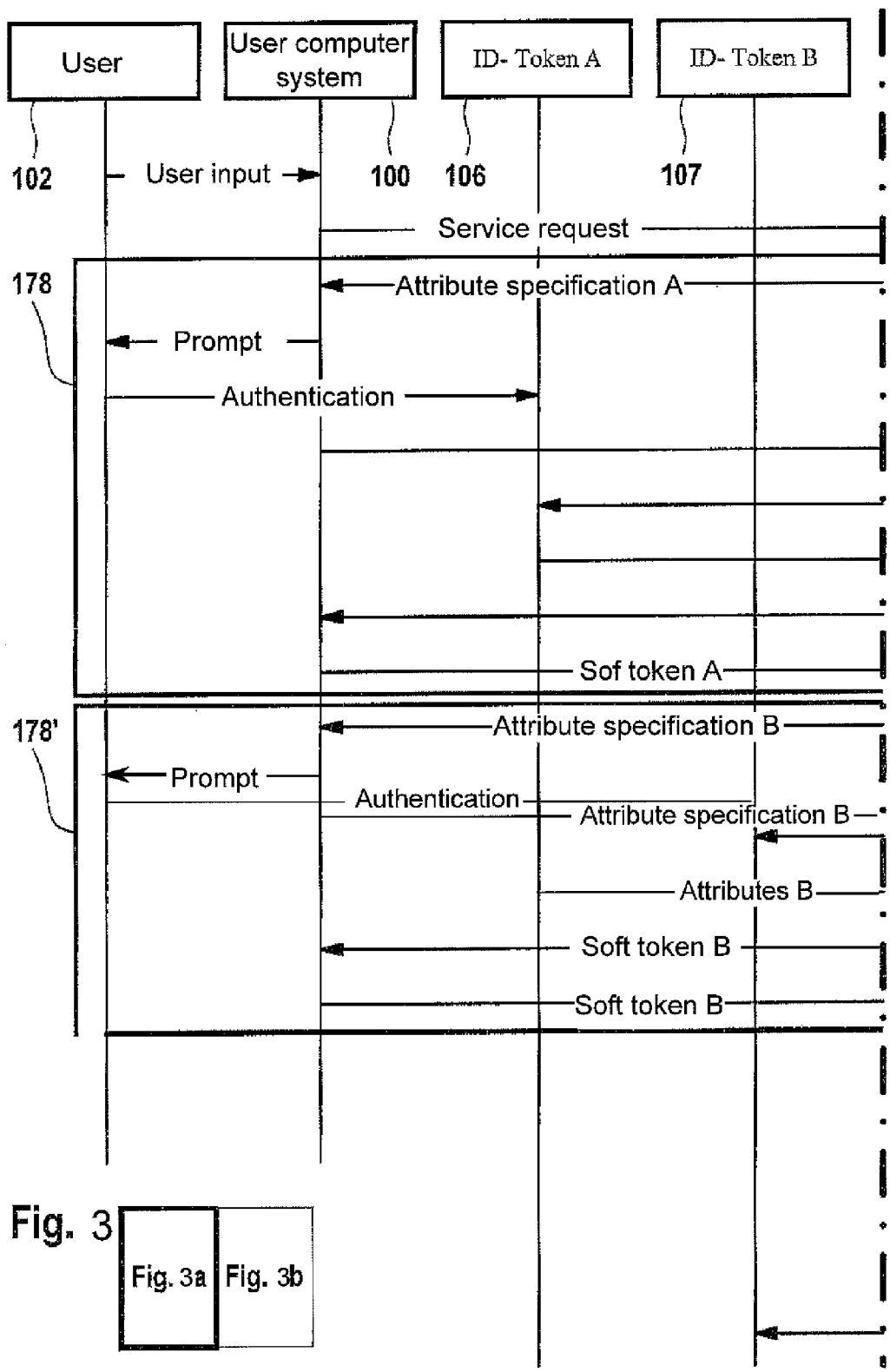
Figure 5:
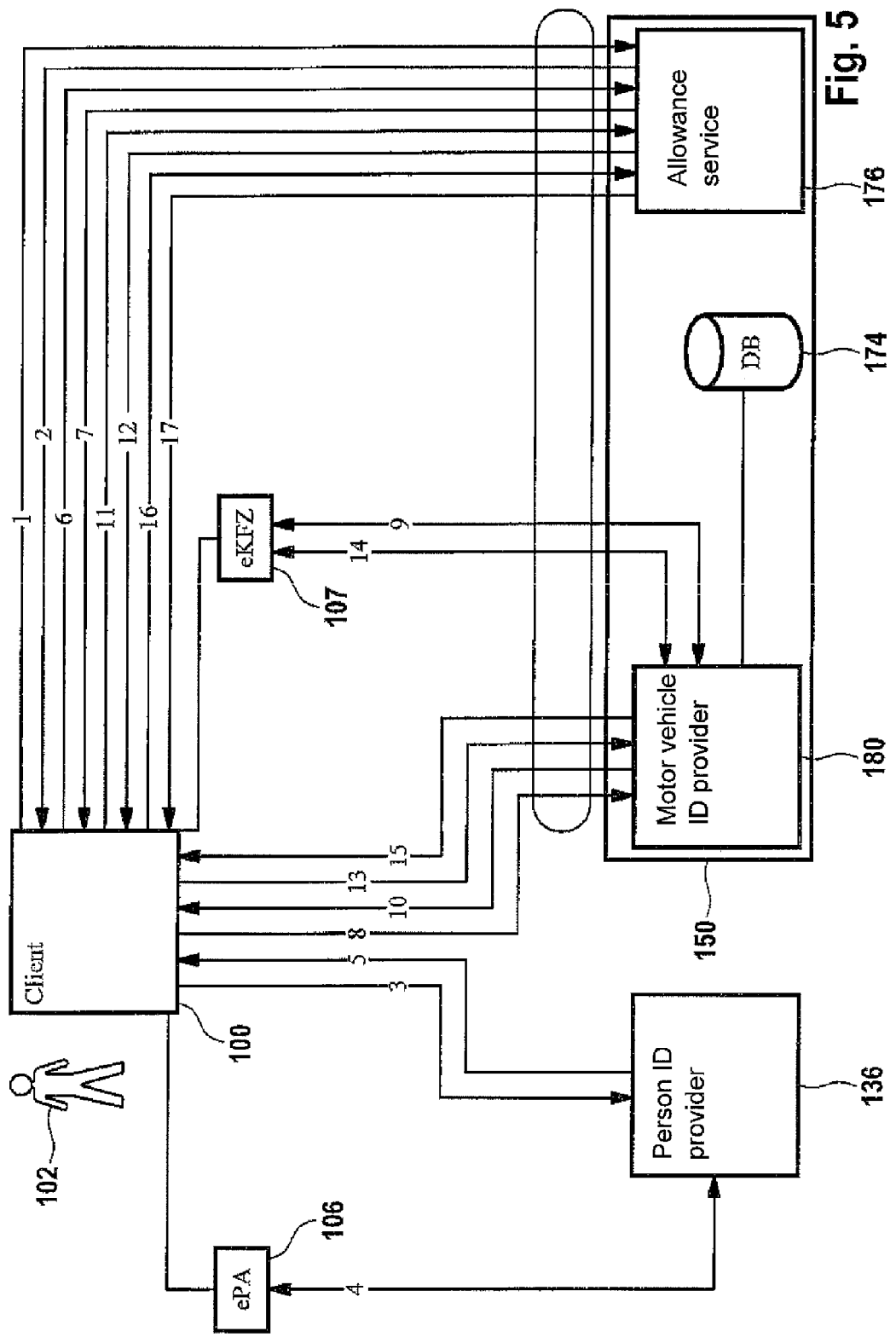

Embodiments of the invention are explained in more detail below with reference to the drawings, in which:

FIG. 1 shows a block diagram of an embodiment of computer systems and ID tokens according to the invention, FIG. 2 shows a flowchart of an embodiment of a method according to the invention, FIG. 3 shows a UML diagram of a further embodiment of a method according to the invention, FIG. 4 shows a UML diagram of a further embodiment of a method according to the invention, and FIG. 5 shows a block diagram of a further embodiment of computer systems and ID tokens according to the invention.

Elements of the embodiments below which correspond to one another are identified by the same reference symbols.

FIG. 1 shows a block diagram of an embodiment of a data processing system according to the invention. The data processing system has a user computer system 100. The user computer system 100 can be a PC, a portable computer, e.g. a laptop or palmtop computer, a Personal Digital Assistant (PDA), a mobile telecommunication device, in particular a smart phone, or the like.

The user computer system 100 serves for communication with the ID token A 106 and the ID token B 107. The communication between the ID tokens A and B on the one hand and the user computer system 100 on the other hand can be a contact connection or a contactless connection, in particular according to an RFID method. The ID token A can be an electronic identity card, i.e. an identity card that comprises an RFID chip where attributes of the user are stored.

In principal the ID token B can be composed similarly to ID token A, wherein the ID token B is not assigned to a user but to a thing, e.g. a motor vehicle. For example the ID token B is a motor vehicle certificate of title or a motor vehicle registration certificate, where attributes of the motor vehicle are stored.

A reading device (not depicted in FIG. 1) is connected to the user computer system 100 or integrated into the user computer system 100, such that the user computer system 100 can communicate with the ID tokens A and B. The reading device is such that a first connection A 101 between the ID token A and the user computer system 100 can be present as well as a second connection B 103 between the ID token B and the user computer system 100. The first and second connections do not necessarily have to be established at the same time, but it sufficient that the connections can be established one after the other.

At least one attribute is stored in the ID token B, which allocates the ID token B to the thing, e.g. the motor vehicle. This attribute can be a so-called unique identifier of the thing, e.g. the motor vehicle identification number or the like.

The user computer system 100 is connected to the service computer system 150 via network 116, e.g. the internet. The service computer system 150 can be a server computer system of a government agency, e.g. the government agency for motor vehicle registrations.

Further the user computer system 100 is connected via the network 116 to the ID provider computer system 136. The ID provider computer system 136 serves for reading the attributes from the ID tokens A and B and for forwarding these attributes to the service computer system 150.

For example if the registration license number of a user's motor vehicle has to be changed due to a relocation of the user without a need for the user to go personally to the government agency.

A first connection A 101 is established between the ID token A and the ID provider computer system 136. The connection 101 is a connection with end-to-end encryption such that data exchanged over connection 101 can neither be decrypted by the user computer system 100 nor by other participants of the network 116.

The ID provider computer system 136 reads via connection 101 at least a first attribute A from the ID token A or several of such attributes A identifying the user unambiguously. This can for example be the name, the birth date and the place of residence of the user.

The attributes A and a time specification are digitally signed by ID provider computer system 136 and forwarded as first soft token to the service computer system 150. Preferably this is performed in such a way that the ID provider computer system 136 does not retain after the the first soft token has been sent to the service computer system 150.

A similar approach is used for attribute B, which is stored in ID token B: A second connection B 103 is established between the ID token B and the service computer system 150. The connection 103 is a connection with end-to-end encryption such that the data exchanged over the connection 101 can not be decrypted by the user computer system 100 or by other participants of the network 116. The attribute B, e.g. the vehicle identification number, is read by the ID provider computer system 136 via connection 103 from ID token B.

Service computer system 150 determines the updated license number of the vehicle, which is identified by attribute B by using the attributes A and B. For example the service computer system 150 determines this new license number with a database query in a database, where such license numbers are stored. The attribute A and/or B may be used for the database query.

The service computer system 150 sends data comprising the new license number of the vehicle to ID token B via connection 103 such that the new license number is stored there. Additionally the service computer system can also write the updated user's address in this manner into ID token B.

In detail embodiments of the system according to the invention can be designed and adapted as follows:

The user computer system 100 has at least one processor 110 for executing program instructions 112 and also a network interface 114 for communication via a network 116. The network may be a computer network, such as the Internet.

The ID token 106 has an electronic memory 118 with protected memory areas 120, 122 and 124. The protected memory area 120 is used for storing a reference value which is required for authenticating the user 102 to the ID token 106. Said reference value is an identifier, for example, particularly what is known as a personal identification number (PIN), or is reference data for a biometric feature of the user 102 which can be used for authenticating the user to the ID token 106.

The protected area 122 is used for storing a private key and the protected memory area 124 is used for storing attributes, for example of the user 102, such as his name, place of residence, date of birth, sex, and/or attributes which relate to the ID token itself, such as the institution which produced or issued the ID token, the validity period of the ID token, or an identifier for the ID token, such as a passport number or a credit card number.

The electronic memory 118 may also have a memory area 126 for storing a certificate. The certificate contains a public key which is associated with the private key stored in the protected memory area 122. The certificate may have been produced on the basis of a public key infrastructure (PKI) standard, for example on the basis of the X.509 standard.

The certificate does not necessarily have to be stored in the electronic memory 118 of the ID token 106. Alternatively or in addition, the certificate may also be stored in a public directory server.

The ID token 106 has a processor 128. The processor 128 is used for executing program instructions 130, 132 and 134. The program instructions 130 are used for user authentication, i.e. for authenticating the user 102 to the ID token.

In an embodiment using PINs, the user 102 inputs his PIN, in order to authenticate himself, into the ID token 106, for example via the user computer system 100. Execution of the program instructions 130 then accesses the protected memory area 120 in order to compare the input PIN with the reference value stored therein for the PIN. If the input PIN matches the reference value of the PIN, the user 102 is deemed to have been authenticated.

Alternatively, a biometric feature of the user 102 is captured. By way of example, the ID token 106 has a fingerprint sensor for this purpose, or a fingerprint sensor is connected to the user computer system 100. The biometric data captured from the user 102 are compared with the biometric reference data stored in the protected memory area 120 by executing the program instructions 130 in this embodiment. If there is a sufficient match between the biometric data captured from the user 102 and the biometric reference data then the user 102 is deemed to have been authenticated.

The program instructions 134 are used for executing the steps of a cryptographic protocol which relate to the ID token 106 in order to authenticate the ID provider computer system 136 to the ID token 106. The cryptographic protocol may be a challenge/response protocol based on a symmetric key or an asymmetric key pair.

By way of example, the cryptographic protocol implements an extended access control method, as is specified for machine-readable travel documents (MRTDs) by the international aviation authority (ICAO). Successful execution of the cryptographic protocol authenticates the ID provider computer system 136 to the ID token, thus proving its read authorization for reading the attributes A stored in the protected memory area 124. The authentication may also be reciprocal, i.e. the ID token 106 then also needs to authenticate itself to the ID provider computer system 136 on the basis of the same or a different cryptographic protocol.

The program instructions 132 are used for the end-to-end encryption of data transmitted between the ID token 106 and the ID provider computer system 136, but at least of the attributes read by the ID provider computer system 136 from the protected memory area 124. For the end-to-end encryption, it is possible to use a symmetric key which is agreed between the ID token 106 and the ID provider computer system 136 when the cryptographic protocol is executed, for example.

The program instructions 131 are used for performing a protocol on the part of the ID token 106. For example the protocol can be a proprietary or standardized protocol, in particular a connection oriented protocol, such as TCP, or a connectionless protocol, such as UDP.

As an alternative to the embodiment shown in FIG. 1, the user computer system 100 can use its' interface 104 to communicate with the interface 108 not directly but rather via a reader, connected to the interface 104, for the ID token 106. This reader, for example what is known as a class 2 chip card terminal, can also be used to input the PIN.

The interface 104 and the reader, if applicable, can be adapted to keep up the connections 101 and 103 (cf. FIG. 1) at the same time. For example two slots for the ID tokens A and B are located in the reader or communication at the same time with the ID tokens A and B is possible via an RF channel.

But the interface 104 and the reader, if applicable, can also be adapted such that the connections 101 and 103 (cf. FIG. 1) can exist not contemporaneously but only one connection at each instant of time. For example only one slot is provided in the reader for the ID tokens A and B. After reading the attributes A from the ID token A the ID token A is removed from the reader and the ID token B is inserted in exchange for enabling to read the attributes B.

The ID token B 107 is composed principally in a similar way as ID token 106 in the embodiment considered here. For describing the single components of ID token B 107 is pointed to the above description of the components of ID token A 106. In contrast to ID token A a write access to the protected storage portion 124' via connection B can be performed for updating the attribute values, which are stored there, with the write data. An exception of this is the attribute value with the unique identifier, i.e. the vehicle identification number, which is unchangeable.

Program instructions 130' and storage portion 120' may be dispensable if no user authentication is provided for ID token 107.

The ID provider computer system 136 has a network interface 138 for communication via the network 116.

The ID provider computer system 136 also has a memory 140 which stores a private key 142 for the ID provider computer system 136 and also the appropriate certificate 144. This certificate may also be a certificate based on a PKI standard, for example, such as X.509.

The ID provider computer system 136 also has at least one processor 145 for executing program instructions 146 and 148. By executing the program instructions 146, the steps of the cryptographic protocol which relate to the ID provider computer system 136 are executed. Overall, the cryptographic protocol is thus implemented through execution of the program instructions 134 by the processor 128 of the ID token 106 and also through execution of the program instructions 146 by the processor 145 of the ID provider computer system 136.

The program instructions 148 are used to implement the end-to-end encryption on the ID provider computer system 136, for example on the basis of the symmetric key which has been agreed between the ID token 106 and the ID provider computer system 136 when the cryptographic protocol is executed. In principle, it is possible to use any method for agreeing the symmetric key for the end-to-end encryption which is known per se beforehand, such as a Diffie-Hellman key exchange.

The program instructions 147 are used to implement the protocol for the communication over the network 116 and the user computer system. The ID provider computer system 136 is preferably situated in a particularly protected environment, particularly in what is known as a trust center, so that the ID provider computer system 136 forms the confidence anchor for the authenticity of the attributes read from the ID token 106 in combination with the need for authentication of the user 102 to the ID token 106.

The program instructions 141 serve for implementing a soft token generator. For generating a soft token first a time specification is determined by using the internal clock 151 of the ID provider computer system 136. This time specification can be the current time of day, which can be output by the internal clock 151. The time specification can also be a system time, in particular if the internal clock 151 and a respective internal clock 153 of the service computer system 150 are synchronized with each other.

The service computer system 150 may be designed to take a service order for initialization, in particular for updating the ID token B.

To this end, the service computer system 150 has a network interface 152 for connection to the network 116. In addition, the service computer system 150 has at least one processor 154 for executing program instructions 156. Execution of the program instructions 156 generates dynamic HTML pages, for example, which the user 102 can use to input his service order.

The processor 154 further serves for executing program instructions 155, by which a soft token check module is realized.

The service computer system 150 further comprises an ID provider module 157 for executing various cryptographic function for establishing the connection 103, which is performed analogously to establishing the connection 101. Hence, with regard to the components of the ID provider module 156 it is referred to the respective components of the ID provider computer system 136. The ID provider module 157 can be an integrated part of the service computer system 150, or it can be a separate computer system, which is coupled to the service computer system 150 via a local connection.

Depending on the nature of the service order, the service computer system 150 needs to receive one or more attributes of ID token 106 from ID provider computer system 136 in order to execute the service order.

To use the service provided by the service computer system 150, the procedure is as follows:

1. Authentication of the user 102 to the ID token 106.

The user 102 authenticates himself to the ID token 106. In an implementation using PINs, the user 102 does this by inputting his PIN, for example using the user computer system 100 or a chip card terminal connected thereto. By executing the program instructions 130, the ID token 106 then checks the correctness of the input PIN. If the input PIN matches the PIN's reference value stored in the protected memory area 120, the user 102 is deemed to have been authenticated. The procedure may be similar if a biometric feature of the user 102 is used to authenticate him, as described above.

2. Authentication of the ID provider computer system 136 to the ID token 106.

To this end, the connection 101 is set up between the ID token 106 and the ID provider computer system 136 via the user computer system 100 and the network 116. By way of example, the ID provider computer system 136 transmits its certificate 144 via this connection to the ID token 106. The program instructions 134 then generate what is known as a challenge, i.e. a random number, for example. This random number is encrypted using the public key of the ID provider computer system 136, which is contained in the certificate 144. The resulting cipher is sent from the ID token 106 via the connection to the ID provider computer system 136. The ID provider computer system 136 decrypts the cipher using its private key 142 and in this way obtains the random number. The random number is returned by the ID provider computer system 136 to the ID token 106 via the connection. By executing the program instructions 134, said ID token checks whether the random number received from the ID provider computer system 136 matches the originally generated random number, i.e. the challenge. If this is the case, the ID provider computer system 136 is deemed to have been authenticated to the ID token 106. The random number can be used as a symmetric key for the end-to-end encryption.

3. When the user 102 has successfully authenticated himself to the ID token 106, and when the ID provider computer system 136 has successfully authenticated itself to the ID token 106, the ID provider computer system 136 is provided with read authorization for reading an attribute, a plurality of attributes or all of the attributes A stored in the protected memory area 124. On the basis of a relevant read command which the ID provider computer system 136 sends to the ID token 106 via the connection, the requested attributes A are read from the protected memory area 124 and they are encrypted by executing the program instructions 132. The encrypted attributes A are transmitted via the connection to the ID provider computer system 136, where they are decrypted by executing the program instructions 148. This provides the ID provider computer system 136 with knowledge of the attributes read from the ID token 106.

4. By executing the program instructions 141 the first soft token is then generated. This may for example be performed by requesting the current time specification from the internal clock 151. This time specification can be an absolute time, e.g. the UTC. A value is added to this current time that corresponds to the remaining time until the planned sending of the first soft token from the ID provider computer system 136 via the network 116. If this time range is too short this step can be omitted. Hence, the time specification is at least approximately the instant of time of sending the first soft token. From this time specification and the attributes a, which are read from the ID token 106, a dataset is generated that is then signed with the private key 142 of the ID provider computer system 136, from where the first soft token results. The first soft token is then either transmitted directly from the ID provider computer system 136 to the service computer system 150 or indirectly via the user computer system 100, from where the first soft token is forwarded to the service computer system 150, therefore depending on the embodiment the approval of the user 102 is required.

The service computer system 150 can check the trustworthiness of the attributes a being comprised in the first soft token, wherefore the program instructions 155 are executed. By executing the program instructions 155 the validity of the signature of the first soft token is checked. Further it is checked if the first soft token is still inside its lifetime. Therefore the current time is requested from the internal clock 153. This is performed for example directly at reception of the first soft token such that this time specification is at least approximately the reception time. The reception time is then compared to the time specification of the first soft token, i.e. the sending time, by calculating the difference between the two times. If the difference is smaller than a predetermined threshold the first soft token is inside its lifetime. Both conditions, i.e. the validity of the signature of the soft token and the reception of the soft token inside its lifetime, must be fulfilled in order that the service computer system 150 can perform the further passes.

By receiving the first soft token the service computer system 150 is notified of the attributes A read from the ID token 106. The need to authenticate the user 102 to the ID token 106 and to authenticate the ID provider computer system 136 to the ID token 106 provides the necessary confidence anchor, so that the service computer system 150 can be certain that the attributes of the user 102 which have been communicated to it by the ID provider computer system 136 are correct and not falsified.

Furthermore it is certain that the first soft token has been received in fact by the ID provider computer system 136 and that not a replay attack is present, when the first soft token has been received during its lifetime.

5. An analogous approach to the above mentioned steps 1 through 3 is used for transmitting at least one attribute B to the service computer system 150. At first the user 102 has to authenticate himself to the ID token 107. This authentication step can also be omitted if it is assumed that the ID token 107 is assigned fixedly only to the motor vehicle 172 and not to the user 102, as it is the case for example for a motor vehicle certificate of title. The ID provider module 157 authenticates itself to the ID token 107, wherefore the connection 103 between the service computer system 105 and the ID token 107 is established via the user computer system 100. For example the ID provider module 157 transmits its certificate 144' via this connection 103 to the ID token 107. A so called challenge is then generated by the program instructions 134', i.e. for example a random number. This random number is encrypted with the open key of the ID provider module 157 being comprised in the certificate 144'. The resulting encrypted data is then transmitted from the ID token 107 via the connection 103 to the ID provider module 157. The ID provider module 157 decrypts the encrypted data by using its private key 142' and receives in this way the random number. The ID provider module 157 sends this random number back to the ID token 107 via the connection 103. There it is checked by executing the program instructions 134' if the random number received from the ID provider module 157 matches with the originally generated random number i.e. the challenge. If this is the case the ID provider module 157 is considered as authenticated towards the ID token 107. The random number can be used as symmetric key for the end-to-end encryption. The ID provider module 157 receives then reading access for reading of one, several or all of the attributes b being stored in the protected storage portion 124' of the ID token 107. Because of a respective reading command, which is sent by the ID provider module 157 via the connection 103 to the ID token 107, the requested attributes b are read from the protected storage portion 124' and encrypted by executing the program instructions 132'. The encrypted attributes b are transmitted via the connection 103 to the ID provider module 157 and decrypted by executing the program instructions 148'. Thereby the ID provider module 157 is notified of the attributes b read from the ID token 107.

As a result the service computer system 150 has then received the attributes A and B in a safe and trustworthy way.

These attributes A are signed by the ID provider computer system using its certificate 144 and are transmitted via the user computer system 100 or directly to the service computer system 150.

6. The service computer system then determines with the aid of attributes A and B the data, which shall be used for updating or initializing for example of an attribute stored in the protected portion 124' of ID token B. For example if the ID token B is assigned to a motor vehicle 172 and the service computer system 150 is an online government agency for registering motor vehicles, the service computer system can determine the license number of the motor vehicle 172 by accessing a database 174 with the aid of attributes A and/or B, which is connected to the service computer system 150. This can be performed such that a database query to database 174 is performed by executing program instructions 156 with the aid of attributes A and/or B in order to retrieve the license number stored there. The service computer system signs the data by using the ID provider module 157 and sends the signed data with a write command to the ID token 107 via connection 103, for example for updating the attribute value of the license number, which is stored in the protected storage portion 124'. Preferably the ID token 107 checks the required write authorization of the ID provider module 157 for this, and this by using the certificate 144'.

Depending on the embodiment, the order of the authentication may be different. By way of example, provision may be made for the user 102 to have to authenticate himself to the ID token 106 first of all, followed by the ID provider computer system 136. In principle, however, it is also possible for the ID provider computer system 136 to have to authenticate itself to the ID token 106 first of all, followed only then by the user 102.

In the first case, the ID token 106 is designed, by way of example, such that it is unlocked only through input of a correct PIN or a correct biometric feature by the user 102. Only this unlocking allows the program instructions 132 and 134 to start and hence the ID provider computer system 136 to be authenticated.

In the second case, it is also possible to start the program instructions 132 and 134 even when the user 102 has not authenticated himself to the ID token 106. In this case, by way of example, the program instructions 134 are in a form such that the ID provider computer system 136 cannot perform read access to the protected memory area 124 for the purpose of reading one or more of the attributes until after the program instructions 130 have signaled that the user 102 has also been successfully authenticated.

Of particular advantage is the utilization of the ID tokens 106 and 107 for e-government applications, for example, specifically without media disruption and legally on the basis of the confidence anchor formed by the need for the user 102 and the ID provider computer system 136 to be authenticated to the ID token 106. Of particular advantage is also the fact that central storage of the attributes of various users 102 is not necessary, which means that the data protection problems which exist in the prior art are solved hereby. As far as the convenience of the application of the method is concerned, it is of particular advantage that prior registration of the user 102 in order to use the ID provider computer system 136 is not necessary.

FIG. 2 shows an embodiment of a method according to the invention. In step 200, a service request is sent from the user computer system to the service computer system. By way of example, the user does this by starting an Internet browser on the user computer system and inputting a URL to call a web page on the service computer system. The user then inputs his service request into the called web page, for example in order to update his ID token B.

For this update it is necessary that at first a connection A between the ID token A and the ID provider is established (cf. ID provider computer system 136 according to the embodiment of FIG. 1) and then a connection B is established between the ID token B and the ID provider module.

In the embodiment considered here establishing the connections A and B is performed sequentially, wherein for example at first the connection A is established. For this purpose the currently used ID token is set equal to the ID token A in step 201.

In step 202, the service computer system 150 then specifies one or more attributes which it requires in order to check the user's authorization for the service request. In particular, the service computer system can specify attributes which determine the digital identity of the user 102. This specification of the attributes by the service computer system 150 may be firmly prescribed or can be determined individually by the service computer system 150 using prescribed rules, depending on the service request.

In step 204, the attribute specification, i.e. the specification performed in step 202 for the one or more attributes, is transmitted from the service computer system to the ID provider computer system, specifically either directly or via the user computer system.

In order to provide the ID provider computer system with the opportunity to read attributes from his ID token, the user authenticates himself to the ID token in step 206.

In step 208, a connection is set up between the ID token and the ID provider computer system. This is preferably a protected connection, for example on the basis of what is known as a secure messaging method.

In step 210, the ID provider computer system is at least authenticated to the ID token via the connection which has been set up in step 208. In addition, there may also be provision for the ID token to be authenticated to the ID provider computer system.

When both the user and the ID provider computer system have been successfully authenticated to the ID token, the ID provider computer system is provided with the access authorization for reading the attributes by the ID token. In step 212, the ID provider computer system sends one or more read commands for reading the attributes required according to the attribute specification from the ID token. The attributes are then transmitted using end-to-end encryption via the protected connection to the ID provider computer system, where they are decrypted.

In step 214 the TD provider computer system generates the first soft token. This can be performed such that at first a time specification is determined. By this time specification the instant of time of sending the first soft token or its maximum lifetime can be specified. The first soft token is generated by combining the attribute values read in previous step 212 and the time specification into one data set and signing the data set. In step 216, the ID provider computer system sends the first soft token via the network to the service computer system. The first soft token reaches the service computer system either directly or via the user computer system.

In the latter case, the user may have the opportunity to take note of the signed attribute values and/or to add further data to them. Provision may be made for the signed attribute values, possibly with the added data, to be forwarded from the user computer system to the service computer system only following release by the user. This provides the greatest possible transparency for the user in terms of the attributes sent from the TD provider computer system to the service computer system.

Thereafter, in step 218 the currently processed ID token is set equal to ID token B and the flow control steps back to step 208, which is then performed with regard to the ID provider module of the service computer system. The subsequent steps 210 and 212 are also performed in the second pass with regard to the ID provider module.

In step 214 the ID provider module can generate a second soft token that is in principle designed in the same way as the first soft token. The second soft token is generated by signing of a dataset, which comprises the attributes b and a time specification. This time specification is for example again a specification of the sending time of the second soft token from the service computer system to the user computer system or the specification of a maximum lifetime. In step 216 the second soft token is transmitted from the ID provider module 157 via the network 106 to the user computer system, from where the second soft token is sent back to the service computer system after authorization of the user 102. In this way the user has also a control possibility regarding the attributes b.

In an alternative embodiment the steps 214 and 216 can be omitted in the second pass.

After reception of the attributes a and b by the service computer system it is checked in step 217 by the service computer system if the first soft token has been received during its lifetime from the service computer system. Therefore it can be preceded such that the service computer system supplies the first soft token at its reception with a time stamp. This time stamp, i.e. the reception time, is compared with the time specification of the first soft token, i.e. the sending time, by calculating the difference. If this difference is bigger than a predetermined threshold the procedure is cancelled in step 219. In the contrary case step 220 is executed afterwards.

In one embodiment with a second soft token the checking in step 217 is preferably also with regard to the second soft token, wherein here the difference between the sending time of the second soft token from the service computer system and the reception time of the reception of the second soft token from the user computer system is calculated and compared to the predetermined threshold by the service computer system.

In step 220 the service computer system then determines the data for updating or initializing the ID token B by using the attributes A and/or B. This can be performed such that the service computer system generates this data, requests this data from a database, or the database is approved for access by the ID provider computer system for reading this data via the network.

Subsequently the ID provider computer system writes the data in step 226 into ID token B via connection B. Therefore it may be required that the connection B is re-established.

FIG. 3 shows a further embodiment of a method according to the invention. A user input from a user 102 into a user computer system 100 is used by the user 102 to specify a service on a service computer system which he or she wishes to use. By way of example, this is done by calling an Internet page on the service computer system and selecting one of the services provided thereon. The service request from the user 102 is transmitted from the user computer system 100 to the service computer system 150.

For example the service computer system comprises a web service 176, in particular a web services architecture specified by W3C. The web service 176 is used as an interface of the service computer system 150 towards the user computer system 100 and/or the ID provider computer system 136.

The service computer system 150 responds to the service request with an attribute specification, i.e. for example a list of attribute names of the required attributes A. When the attribute specification has been received, the user computer system 100 asks the user 102 to authenticate himself to the ID token 106, for example by means of an input request.

The user 102 then authenticates himself to the ID token 106, for example by inputting his PIN. Following successful authentication, the attribute specification is forwarded from the user computer system 100 to an ID provider computer system 136. For this purpose the connection A is established. The Id provider computer system 136 authenticates itself to the ID token 106 and sends a read request for reading the attributes A according to the attribute specification A to the ID token 106.

Assuming the prior successful authentication of the user 102 and of the ID provider computer system 136, the ID token 106 responds to the read request with the desired attributes A. The ID provider computer system 136 then generates the first soft token with the attributes A and a time specification, e.g. the instant of time of sending the first soft token or the lifetime. The ID provider computer system 136 then send the first soft token to the user computer system 100. Following release by the user 102, the first soft token are then transmitted to the service computer system 150. The service computer system 150 can then check the validity of the signature of the first soft token and if the first soft token has been received during its lifetime from the service computer system 150. Hence, after performing this part sequence 178 the service computer system 150 ha received the attributes A.

The part sequence 178' intended for the attributes B can be performed in an analogous way:

The service computer system 150 responds to receiving the attributes A with an attribute specification B, i.e. for example a list of attribute names of the required attributes B.

After reception of the attribute specification B the user computer system 100 asks the user 102 for authentication towards the ID token 107, for example by a prompt. The authentication of the user 102 towards the ID token 107 can also be omitted, if it is assumed that the ID token 107 is assigned to the motor vehicle 172 and not primarily to the user 102.

The attribute specification b is transmitted from the user computer system 100 via the web service 176 to the ID provider module 180. Therefore the connection B is established. The ID provider module 180 authenticates itself towards the ID token 107 and directs a reading request for reading the attributes B according to the attribute specification B to the ID token 107.

The ID token 107 answers to the reading request with the requested attribute B. The ID provider module 180 then generates the second soft token B with the attributes b and a time specification, e.g. the instant of time of sending the second soft token or the lifetime. The ID provider module 180 sends then the second soft token to the user computer system 100. After approval by the user 102 the second soft token is then transmitted to the user computer system 150.

The user computer system 150 can then check the validity of the signature of the second soft token and check if the second soft token has been received during its lifetime from the service computer system 150. After performing this part sequence 178' the service computer system 150 has also received the attributes B.

The service computer system 150 uses then the attributes a and/or b for determining the current or the initial attribute values for writing into the ID token B.

For this purpose the attributes A and/or B can be used to perform a database query to the database 174. The database entries identified by the database query in the database 174, which comprise the data to be written into the ID token B, are used for generating a data set. In particular the dataset can also comprise the attributes a. This dataset is then written via the connection b into the ID token 107. Preferably the dataset is sent in form of a third soft token from the service computer system 150 to the ID token B.

The third soft token can comprise again a time specification in addition to the dataset, as it is also the case for the first and the second soft token. The time specification can be a specification of a sending time or a lifetime of the third soft token. The ID token B can check the validity of the signature of the third soft token and the ID token B can check if the third soft token is still valid, i.e. depending on the embodiment if the first soft token of the ID token B has been received at a reception time that does not differ from the sending time more than a predetermined threshold or if the third soft token has been received during its specified lifetime from the ID token B. After having performed these checkings successfully the ID token B accepts the third soft token and the dataset received with the third soft token is stored in the storage portion 124' (see FIG. 1) of the ID token B in order to update and initialize the attribute values stored in there.

FIG. 4 shows an alternative embodiment. The part sequence 178 can be designed identically as in the embodiment of FIG. 3. The part sequence 178' differs from the part sequence 178 in the embodiment of FIG. 3 in that no second soft token is generated but the attributes b are communicated directly to the web service 176 inside the service computer 150 after reception of the attributes B by the ID provider module 180.

In the embodiment of FIG. 5 the user computer system 100 is designed as client computer. The ID token A 106 is an electronic passport "ePA". The ID token B 107 is an electronic motor vehicle document, for example an electronic motor vehicle registration certificate or an electronic motor vehicle certificate of title "eKFZ". The web service 176 is constructed herein as an allowance service, i.e. the web service provides various services for the online registration or registration transfer of motor vehicles. The web service 176 and the ID provider module 180, i.e. the "motor vehicle ID provider" as well as the database 174 belong to the same service computer system 150.

For updating the ID token 107, for example with a new license number, the following steps are performed:

1. The user retrieves a service provided by the web service 176 from his user computer system 100 by using a service request.
2. The web service 176 responds to this service request with an authentication request, i.e. the web service 176 specifies those attributes A by using the attribute specification A, which it needs with regard to the user 102. This authentication request is sent from the web service 176 to the user computer system 100. Further the web service 176 sends an information to the user computer system 100, which indicates that the connection A can be canceled after having read the attributes A and their transmission to the ID provider 136.

3. A request for confirming the user ID is sent from the user computer system 100 to the ID provider 136. This request comprises the attribute specification A, i.e. a specification of the attributes A, which shall be read from the ID token 106. Further the information, that the connection A to be established with the ID token 106 shall be kept up after reading the attributes from the ID token 106, is sent from the user computer system 100 to the ID provider computer system 136.
4. The connection A is then established between the ID provider computer system 136 and the ID token 106 and the ID provider computer system 136 reads the attributes from the ID token A. After having read the attributes A the connection is canceled.
5. The ID provider computer system 136 sends the attributes A to the user computer system 100 in response to the request of step 3.
6. The user computer system 100 sends the attributes A to the web service 176 in response to the authentication request of step 2.
7. The web service 176 send an authentication request regarding attributes B to the user computer system 100, i.e. regarding such attributes B that are stored in the ID token 107. Hence, the authentication request comprises an attribute specification of the attributes B.
8. The user computer system 100 sends a request for a motor vehicle ID confirmation to the ID provider module 180, i.e. a request for providing the attributes B as specified by the attribute specification B received in step 7 with the authentication request.
9. The ID provider module 180 establishes the connection B to the ID token 107 and reads via this connection the attributes B. After reading the attributes B the connection B can be kept up or can be canceled depending on the embodiment.
10. The ID provider module 180 sends the attributes B to the user computer system 100 as response to the request of step 8.
11. The user computer system 100 sends the attributes B to the web service 176 as response to the authentication request of step 7.
12. The web service 176 generates a soft token with at least the attributes b or the attributes a and b and a time specification, for example the sending time or a lifetime. This soft token is sent from the web service 176 to the user computer system 100.
13. After approval of the user the soft token is forwarded from the user computer system 100 to the ID provider module 180.
14. The ID provider module 180 checks the validity of the soft token with regard to the validity of the signature and the reception time of the soft token at the service computer system 150 by using the time specification being comprised in the soft token. If the soft token is alright the ID provider module performs a database request in the database 174, wherein the attributes A and/or B are used as search criteria. The ID provider module 180 generates a dataset from the data determined by the database request, the attributes A, and/or B, wherein the dataset is written by the ID provider module 180 via the connection b into the ID token B.
15. In this step the user computer system 100 receives an acknowledgement from the ID provider module 180 being indicative of the fact that writing the data into the ID token B has been performed.
16. This acknowledgement is forwarded by the user computer system 100 to the web service 176.

The communication between the service computer system 150 and the user computer system 100 can also be performed as a SSL session with a strong key, for example an elliptic curve key.

LIST OF REFERENCE SYMBOLS

100 User computer system
101 Connection A
102 User
103 Connection B
104 Interface
106 ID token
107 ID token
108 Interface
110 Processor
112 Program instructions
114 Network interface
116 Network
118 Electronic memory
120 Protected memory area
122 Protected memory area
124 Protected memory area
126 Memory area
128 Processor
130 Program instructions
131 Program instructions
132 Program instructions
134 Program instructions
136 ID provider computer system
138 Network interface
140 Memory
141 Program instructions
142 Private key
144 Certificate
145 Processor
146 Program instructions
147 Program instructions
148 Program instructions
149 Program instructions
150 Service computer system
151 Internal clock
152 Network interface
153 Internal Clock
154 Processor
155 Program instructions
156 Program instructions
157 ID provider module
172 Motor vehicle
174 Database
176 Web service
178 Part sequence
180 Component

What is claimed is:
1. A telecommunication method having the following steps:
establishing a first connection between a first ID token and a first computer system via a second computer system for reading at least one first attribute from the first ID token, generating a first soft token, wherein the first soft token comprises the at least one first attribute and a time specification, and wherein the first soft token is signed by the first computer system, sending the first soft token from the first computer system to a third computer system, wherein the first connection is a connection with end-to-end encryption, wherein the third computer system performs the following steps:

receiving the first soft token at a reception time, establishing a second connection over the second computer system to a second ID token for reading at least one second attribute from the second ID token, determining data by using the first and/or the second attributes, said determining performed by either:

calculating the data from the first and the second attributes by the third computer system, or accessing a database with the aid of the first and the second attributes and querying the data from the database by the third computer system, writing the data over the second connection for storing the data in the second ID token, wherein the second connection is a connection with end-to-end encryption, and wherein writing the data over the second connection is only performed if the first soft token is valid at the reception time, wherein the validity is checked by using the time specification, wherein the validity is checked by calculating a difference between the reception time and the time specification comprised by the first soft token and comparing the difference with a threshold.

2. Method according to claim 1, wherein the time specification is the sending time of sending the first soft token, the instant of time of generating the first soft token or a specification of the maximum lifetime of the first soft token.

3. Method according to claim 1, wherein the first ID token is a document of value or security.

4. Method according to claim 1, wherein the following steps are performed for establishing the first connection:

a user is authenticated to the first ID token, the first computer system is authenticated to the first ID token, wherein following successful authentication of the user and the first computer system to the first ID token a read access to the at least one first attribute stored in the first ID token is performed by the first computer system for transmission of the first attribute with the first soft token to the third computer system.

5. The method as claimed in claim 4, wherein the first computer system is authenticated to the first ID token using a certificate of the first computer system, wherein the certificate contains an indication of those attributes stored in the first ID token for which the first computer system is authorized for the read access.

6. The method as claimed in claim 5, wherein the first ID token checks the read authorization of the first computer system for the read access to at least the first attribute using the certificate.

7. The method as claimed in claim 4, wherein the first soft token is sent from the first computer system to the second computer system, from where it is forwarded to the third computer system following release by the user.

8. The method as claimed in claim 1, having the following further steps:

a service request is sent from the second computer system to the third computer system, the at least one first attribute is specified by the third computer system, an attribute specification for specifying the first attribute is sent from the third computer system to the first computer system, wherein the read access by the first computer system to the first ID token is effected in order to read the attribute specified in the attribute specification.

9. The method as claimed in claim 8, wherein the service request contains an identifier for identification of the first computer system for selecting the first computer system.

10. The telecommunication method as claimed in claim 1, wherein the threshold is selected bigger than a medium time period for transmitting the first soft token from the first computer system to the third computer system.

11. The telecommunication method as claimed in claim 1, wherein the second connection is established between the second ID token and a cryptographic module of the third computer system.

12. The telecommunication method as claimed in claim 1, wherein the second ID token is a value or security document.

13. The telecommunication method as claimed in claim 1, wherein the second ID token is assigned to a thing, wherein the second attribute identifies the thing non-ambiguously.

14. The telecommunication method as claimed in claim 1, wherein the third computer system is authenticated to the second ID token for establishing the second connection, wherein the authentication is performed by using a certificate of the third computer system, wherein the certificate contains an indication of those attributes stored in the second ID token, wherein the second ID token checks the read authorization of the third computer system for the read access to at least the second attribute using the certificate.

15. The telecommunication method as claimed in claim 14, wherein the certificate comprises a specification of the write and read rights of the third computer system for reading the second attributes and for writing the data into the second ID token, wherein the second ID token checks the write authorization of the third computer system for the write access to write the data using the certificate.

16. A computer system having a first connection device, the first connection device operable to establish a first connection between a first ID token via a second computer system for reading at least one first attribute from the first ID token, a soft token generation device, the soft token generation device operable to generate a first soft token, wherein the first soft token comprises the at least one first attribute and a time specification, a transmission device, the transmission device operable to send the first soft token to a third computer system, wherein the first connection is a connection with end-to-end encryption, wherein the third computer system has:

a receiving device, the receiving device operable to receive a first soft token at a reception time, wherein the first soft token is signed by a first computer system, a communications device, the communications device operable to establish a second connection over the second computer system to a second ID token for reading at least one second attribute from the second ID token, a data determination device, the data determination device operable to determine data by using the first and/or the second attributes, the data determination device determining the date by either:

calculating the data from the first and the second attributes by the third computer system, or accessing a database with the aid of the first and the second attributes and querying the data from the database by the third computer system,
a writing device, the writing device operable to write the data over the second connection for storing the data in the second ID token,
wherein the second connection is a connection with end-to-end encryption, and wherein writing the data over the second connection is only performed if the first soft token is valid at the reception time, wherein the validity is checked by using the time specification, wherein the validity is checked by calculating a difference between the reception time and the time specification comprised by the first soft token and comparing the difference with a threshold.

17. The computer system as claimed in claim 16, with an internal clock for generating the time specification.

18. The computer system as claimed in claim 17, wherein the time specification is the sending time of sending the first soft token, the instant of time of generating the first soft token or a specification of the maximum lifetime of the first soft token.

19. The computer system as claimed in claim 16, wherein the second connection is established between the second ID token and a cryptographic module of the third computer system.

20. The computer system as claimed in claim 16, having a time basis for determining the reception time.

21. The computer system as claimed in claim 16, additionally comprising a soft token generation device, the soft token generation device operable to generate a second soft token, wherein the second soft token comprises at least the second attribute, and wherein the second soft token is sent to the second computer system.

22. A non-transitory computer readable medium having instructions thereon, said instructions executable on a computer and comprising the following steps:

establishing a first connection between a first ID token and a first computer system via a second computer system for reading at least one first attribute from the first ID token,
generating a first soft token, wherein the first soft token comprises the at least one first attribute and a time specification, and wherein the first soft token is signed by the first computer system,
sending the first soft token from the first computer system to a third computer system, wherein the first connection is a connection with end-to-end encryption, wherein the third computer system executes said instructions which further comprises the following steps:
receiving the first soft token at a reception time,
establishing a second connection over the second computer system to a second ID token for reading at least one second attribute from the second ID token,
determining data by using the first and/or the second attributes, said determining performed by either:
calculating the data from the first and the second attributes by the third computer system, or
accessing a database with the aid of the first and the second attributes and querying the data from the database by the third computer system,
writing the data over the second connection for storing the data in the second ID token, wherein the second connection is a connection with end-to-end encryption, and wherein writing the data over the second connection is only performed if the first soft token is valid at the reception time, wherein the validity is checked by using the time specification, wherein the validity is checked by calculating a difference between the reception time and the time specification comprised by the first soft token and comparing the difference with a threshold.

* * * * *

UNITED STATES PATENT AND TRADEMARK OFFICE
CERTIFICATE OF CORRECTION

PATENT NO. : 8,726,360 B2
APPLICATION NO. : 13/120983
DATED : May 13, 2014
INVENTOR(S) : Dietrich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 4 days.

Signed and Sealed this
Twenty-ninth Day of September, 2015

Michelle K. Lee
*Director of the United States Patent and Trademark Office*